2,864,810

Patented Dec. 16, 1958

2,864,810

COGENERIC GLYCOL ETHERS OF PARTIAL ESTERS OF PENTAERYTHRITOL AND ROSIN

Jack B. Batdorf, Wilmington, Del., assignor to Hercules Powder Company, Wilmington, Del., a corporation of Delaware No Drawing. Application March 30, 1955
Serial No. 498,095

4 Claims. (Cl. 260—104)

The present invention relates to a composition of matter which comprises a cogeneric mixture of glycol ethers derived from the reaction of a partial ester of pentaerythritol and rosin with an alkylene oxide selected from the group consisting of ethylene oxide and combinations thereof with propylene oxide and to a process for breaking petroleum emulsions which comprises subjecting a petroleum emulsion of the water-in-oil type to the action of the composition.

Crude oil as received in many oil fields is in the form of a water-in-oil emulsion with natural waters and brines being dispersed in the oil. Before pumping a crude oil of this type into pipelines, it is desirable to remove the water and many methods have been devised for this purpose. The most common methods utilize heat, electricity or a surface-active compound to break the emulsion so that the water may be separated easily from the oil.

The present invention provides a composition of matter which has been found outstanding as a surface-active agent for breaking petroleum emulsions of the water-in-oil type and further provides a process for breaking petroleum emulsions in which the composition of the invention plays an essential role.

The composition of the invention is prepared by the reaction of a partial ester of pentaerythritol and rosin with ethylene oxide or with a combination of ethylene oxide and propylene oxide. In accordance with established practice in the art, this reaction product can be described broadly as a cogeneric mixture of homologous glycol ethers and is best defined in terms of the reactants. More specifically, therefore, the composition of the invention comprises a cogeneric mixture of homologous glycol ethers obtained by the reaction of a partial ester of pentaerythritol and rosin with an alkylene oxide selected from the group consisting of ethylene oxide and combinations thereof with propylene oxide, the amount of alkylene oxide being from about 10 to 100 moles for each mole of said partial ester and the amount of propylene oxide not exceeding about 60 mole percent of the total alkylene oxide. In general, the compositions are waxy, water-soluble solids of high surface activity.

The process of the invention comprises subjecting a petroleum emulsion of the water-in-oil type to the action of the above-described composition and it can follow any of several manipulative procedures known to the art. Outstanding results in the process are achieved when the composition is one prepared from a combination of ethylene oxide and propylene oxide in which the propylene oxide is present in the range of 40 to 50 mole percent of the total alkylene oxide and, accordingly, compositions of this description are the preferred compositions of the invention.

In order to more fully illustrate the composition and process of the invention, the following examples are presented in which parts and percentages are by weight unless otherwise specified. The pentaerythritol diresinate utilized as a reactant in the examples was prepared by reacting one mole of pentaerythritol with two moles of N wood rosin at a temperature of 285–290° C. under an atmosphere of nitrogen until an acid number of about 8 was reached.

Example 1

This example describes the preparation of a cogeneric mixture of glycol ethers by the reaction of pentaerythritol diresinate with ethylene oxide in a ratio of 1 mole of the former to 40 moles of the latter.

The apparatus for this and subsequently described preparations consisted of an electrically heated stirred autoclave, a pump and weigh tank for introducing alkylene oxide, and suitable pressure and temperature indicating and control equipment. An electrically heated circulating oil system was used both to heat the charge at the start of a run and to cool the autoclave, when necessary, during the run.

The autoclave was charged with 500 parts of pentaerythritol diresinate and 7.5 parts of sodium resinate, heated to 146° C. and 1280 parts of ethylene oxide was pumped in at the rate of 400–600 parts per hour, the temperature being held at 160–166° C. by cooling and the pressure rising spontaneously to about 100 p. s. i. (A small excess of ethylene oxide was pumped in to allow for leaks, holdup in lines, etc.) When the ethylene oxide had all been added, the reaction was allowed to continue at constant temperature until the pressure dropped to a constant value, indicating completion of the reaction. The autoclave was then cooled and product drained. A 97.9% yield of waxy, solid product was obtained. Physical properties were: saponification number 74 and OH value 0.85%.

Example 2

This example illustrates the preparation of a cogeneric mixture of glycol ethers by the reaction of pentaerythritol diresinate with a mixture of ethylene oxide and propylene oxide in the proportion of 1 mole of ester to 40 moles of alkylene oxide mixture. The mixture of alkylene oxides in this and succeeding examples was composed of 45.7 mole percent of propylene oxide.

The apparatus and procedure were similar to that used in Example 1. Five hundred parts of pentaerythritol diresinate and 2.5 parts of sodium methylate (catalyst) were charged to the autoclave and heated to 146° C. The alkylene oxide mixture was then pumped in at 400–600 parts per hour, the temperature being held at 170–177° C. The product was obtained in a yield of 98.5%. Physical constants were: saponification number 48.5 and OH value 1.67%.

Example 3

This example describes the preparation of a cogeneric mixture of glycol ethers by the reaction of pentaerythritol diresinate with a mixture of alkylene oxides in the ratio of one mole of the former to 70 moles of the latter.

Apparatus and procedure were the same as in Example 2. Three hundred and fifty parts of pentaerythritol diresinate and 1.8 parts of sodium methylate were charged to the autoclave and heated to 148° C. One thousand and fifty parts of alkylene oxide mixture was pumped in while the temperature was held at 170–175° C. Reaction was continued until the pressure dropped to a constant value. A 98.6% yield of product was obtained. Physical constants were: acid number 0.04, saponification number 9.8, OH value 1.5%.

Example 4

This example describes the preparation of a cogeneric mixture of glycol ethers by the reaction of pentaerythritol diresinate with a mixture of alkylene oxides in the ratio of one mole of the former to 20 moles of the latter.

Seven hundred parts of pentaerythritol diresinate and 3.5 parts of sodium methylate were charged to the autoclave and heated to 152° C. Six hundred and five parts of alkylene oxide mixture was then pumped in while the temperature was held at 170–173° C. Reaction was continued until the pressure dropped to a constant value. One thousand two hundred and sixty-nine parts of product was recovered having an acid number of nil, saponification number of 11.8 and OH value of 2.55%.

*Example 5*

This example describes the preparation of a cogeneric mixture of glycol ethers by the reaction of pentaerythritol diresinate with a mixture of alkylene oxides in the ratio of one mole of the former to 35 moles of the latter.

Four hundred and fifty parts of pentaerythritol diresinate and 2.3 parts of sodium methylate were charged to the autoclave and heated to 148° C. Six hundred and seventy-five parts of alkylene oxide mixture was pumped in while the temperature was held at 170–174° C. Reaction was continued until the pressure dropped to a constant value. One thousand one hundred and two parts of product was recovered having an acid number of 0.04, saponification number of 9.8 and OH value of 2.0%.

*Example 6*

This example describes the preparation of a cogeneric mixture of glycol ethers by the reaction of pentaerythritol diresinate with a mixture of alkylene oxides in the ratio of one mole of the former to 50 moles of the latter.

Four hundred parts of pentaerythritol diresinate and 2.0 parts of sodium methylate were charged to the autoclave and heated to 148° C. Eight hundred and sixty parts of alkylene oxide mixture was then pumped in while the temperature was held at 168–172° C. Reaction was continued until the pressure dropped to a constant value. One thousand one hundred and ninety-seven parts of product was recovered having an acid number of 0.06, saponification number of 11.6 and OH value of 1.8%.

The general principles and procedures involved in the preparation of the compositions of the invention are known to the art, since previously many compounds having one or more free hydroxyl groups have been reacted with alkylene oxides to form, in any given instance, a cogeneric mixture comprising a homologous series of glycol ethers of the original hydroxyl compound. As in the case of related prior art reactions, the preferred procedure, which is illustrated in the preceding examples, comprises introducing ethylene oxide or a combination of ethylene oxide and propylene oxide to the partial ester of pentaerythritol and rosin in an autoclave at an elevated temperature and pressure in the presence of an alkaline catalyst. Preferred temperatures for the reaction range from about 150–180° C., preferred pressures, from 50 to 300 p. s. i., and suitable catalysts include alkaline compounds such as alkali metal alcoholates, e. g., sodium or potassium methoxide, and alkali metal resinates, e. g., sodium or potassium resinate. An inert solvent for the ester can also be used, if desired, to facilitate the reaction and, when a mixture of alkylene oxides is reacted, the oxides may be added in admixture or sequentially. Completion of the reaction is ordinarily indicated by a drop to a constant pressure between 10 and 50 p. s. i.

In addition to the pentaerythritol diresinate employed as a reactant in the examples, other partial esters of pentaerythritol and rosin may be employed with equivalent results. Exemplary of such esters are pentaerythritol monoresinate and pentaerythritol triresinate. These esters can also be prepared from equivalents of pentaerythritol and of rosin. Thus, instead of pentaerythritol, the esters can be prepared from polypentaerythritols such as di- and tri-pentaerythritol. Likewise, modified rosins such as the hydrogenated, dehydrogenated, disproportionated and polymerized rosins are equivalent to ordinary rosin in practicing the invention.

In using the above compositions in the process of breaking petroleum emulsions, they can be added to the petroleum emulsion as such or after dilution with any suitable solvent such as water; petroleum hydrocarbons, e. g., benzene, toluene, xylene, cresol, etc.; alcohols, e. g., methyl alcohol, ethyl alcohol, propyl alcohol, etc.; or miscellaneous solvents, such as pine oil, carbon tetrachloride, and the like.

The compositions are preferably added to the petroleum emulsion in small amounts ranging from about 20 to 100 parts per million parts of emulsion and, upon contact achieved by shaking or other means of agitation, the petroleum emulsion will break rapidly and separate into an oil layer and a water layer. The water layer can then be removed from the oil by decantation or equivalent means. Some of the compositions of the invention exhibit relatively limited oil solubility but this is insignificant because the compositions appear to have solubility at the concentrations customarily employed in the breaking of petroleum emulsions.

The composition can also be employed in the procedure commonly known as "down the hole procedure," i. e., bringing the composition into contact with the fluids of an oil well at the bottom of the well or at some point prior to the emergence of such fluids from the ground.

The ability of the compositions to act as de-emulsifying agents for petroleum emulsions of the water-in-oil type is evidenced by the following data which were obtained by adding the compositions of Examples 1, 2 and 3 in xylene solution to separate portions of a typical water-in-oil petroleum emulsion (20% water content) in the amount of 50 parts per million parts of the emulsion. The emulsion was then subjected to 250 shakes on a mechanical agitator to insure uniform dispersion for each of the compositions, and the emulsion was thereafter poured into a tall cylindrical glass vessel and observed for color change, the darker the color, the more efficient the de-emulsification. The samples were then centrifuged for 10 minutes at 1500 R. P. M. and a sample of the oil layer was analyzed for residual water. The compositions showed excellent de-emulsifying activity in comparison with commercially used de-emulsifiers, the analyses of the oil layers being as follows:

| Composition: | Percent water in oil layer |
|---|---|
| Example 1 | 13 |
| Example 2 | 7.2 |
| Example 3 | 5.7 |

The above data show that the compositions of all three examples are capable de-emulsifying agents but that those of Examples 2 and 3 are noticeably superior to that of Example 1.

The compositions of Examples 4, 5 and 6, when employed in similar processes for the breaking of a water-in-oil petroleum emulsion, gave results equivalent to those obtained by the use of the compositions of Examples 2 and 3.

What I claim and desire to protect by Letters Patent is:

1. A composition comprising a cogeneric mixture of glycol ethers derived from the reaction of a partial ester of a pentaerythritol selected from the group consisting of pentaerythritol and polypentaerythritols and a rosin selected from the group consisting of rosin, hydrogenated rosin, dehydrogenated rosin, disproportionated rosin, and polymerized rosin with an alkylene oxide selected from the group consisting of ethylene oxide and combinations thereof with propylene oxide, the amount of alkylene oxide being from about 10 to 100 moles for each mole of said ester.

2. A composition comprising a cogeneric mixture of glycol ethers derived from the reaction of a partial ester of pentaerythritol and rosin with an alkylene oxide selected from the group consisting of ethylene oxide and combinations thereof with propylene oxide, the amount of alkylene oxide being from about 10 to 100 moles for each mole of said partial ester and the amount of propylene oxide not exceeding 60 mole percent of the total alkylene oxide.

3. The composition of claim 2 in which the partial ester of pentaerythritol and rosin is pentaerythritol diresinate.

4. The composition of claim 3 in which the alkylene oxide comprises from 40 to 50 mole percent propylene oxide.

References Cited in the file of this patent

UNITED STATES PATENTS

| | | |
|---|---|---|
| 2,307,058 | Moeller | Jan. 5, 1943 |
| 2,454,808 | Kirkpatrick et al. | Nov. 30, 1948 |
| 2,507,560 | De Groote | May 16, 1950 |
| 2,555,901 | Rummelsburg | June 5, 1951 |
| 2,586,767 | Wilson | Feb. 19, 1952 |
| 2,590,910 | Witcoff et al. | Apr. 1, 1952 |